Jan. 24, 1956

W. K. SCHNEPF 2,732,523

MOTOR CONTROL MEANS

Filed April 6, 1953

INVENTOR.
WILLIAM K. SCHNEPF
BY
George H. Strickland
ATTORNEY

United States Patent Office 2,732,523
Patented Jan. 24, 1956

2,732,523

MOTOR CONTROL MEANS

William K. Schnepf, Webster, N. Y., assignor to General Motors Corporation, Detroit, Mich., a corporation of Delaware Application April 6, 1953, Serial No. 347,106

14 Claims. (Cl. 318—466)

The present invention pertains to electric motor control means, and more particularly to means for controlling an electric motor employed to actuate power driven windshield wiper mechanisms wherein the wiper blades are parked by motor inertia or coasting.

It appears that in the not too distant future, power operated windshield wiper mechanisms will replace suction operated devices now commonly employed and thereby render them obsolete. However, one of the obstacles to overcome in attempting to replace suction operated wipers is the cost factor. Another obstacle encountered in the design of power driven wipers is that of providing means for parking the wiper blades out of the normal range of vision against the cowl of a motor vehicle in a manner which automobile owners have become accustomed to. Numerous attempts have been made in the past to design a power driven wiper, which will perform all of the desirable functions of a suction operated wiper, and yet be competitive from a cost standpoint. This invention pertains particularly to electric motor driven windshield wipers in which motor inertia, or coasting speed, is employed to move the blades to a predetermined parked position, which may be either at one end of their normal strokes or displaced from one end of their normal stroke and against the cowl of a motor vehicle, the latter method being preferred.

The most difficult problem encountered in designing wiper actuating mechanisms wherein coasting speed is employed to park the blades, is that of the variable friction conditions between the wiper blades and the windshield. For example, the friction between a wet windshield and a wiper blade is rather low, while the friction between a windshield which is tacky (the condition of a windshield just at the drying point) is rather high. Accordingly, among my objects are the provision of means automatically operable to deenergize electric motor at such a time when, for example, regardless of the condition of the windshield, the motor will have sufficient inertia to move the blades to a predetermined parked position; the further provision of means which compensate automatically for varying conditions of friction between the wiper blade and the windshield; and the still further provision of means which control the deenergization of the motor to assure proper inertia parking by being responsive to the amount of motor current.

The aforementioned and other objects are accomplished in the present invention by employing compensating switch means which automatically time the opening of a parking switch in accordance with windshield friction so that the blades will always come to rest in a predetermined parked position by motor inertia or the coasting motor speed. Specifically, this invention contemplates the inclusion of an electromagnetic device through which all of the motor current flows. Since the total motor current is a function of the friction load, it is readily apparent that if the opening of a parking switch is modified by an electromagnetic device of the character previously alluded to, the motor inertia, or coasting energy of the motor after deenergization, can be controlled so as to insure that the blades will always be parked in a predetermined position.

The improved parking switch of this invention includes a pair of switch contacts, one of which is carried by a resilient member having an armature which cooperates with an electromagnet. The winding of the electromagnet is connected in series with the motor such that all current flowing through the field coils and armature of the motor passes through the coil. The resilient contact carrying member is rigidly attached to mounting structure at one end, the other end of this member being operatively connected with suitable operating means driven by the wiper or actuating mechanism therefor, so that when the manual control switch for the motor is moved to an off-position, the motor will be deenergized at a predetermined position of the wiper blades, after which blades may travel to a predetermined parked position.

Further objects and advantages of the present invention will be apparent from the following description, reference being had to the accompanying drawing wherein a preferred embodiment of the present invention is clearly shown.

Figure 1:
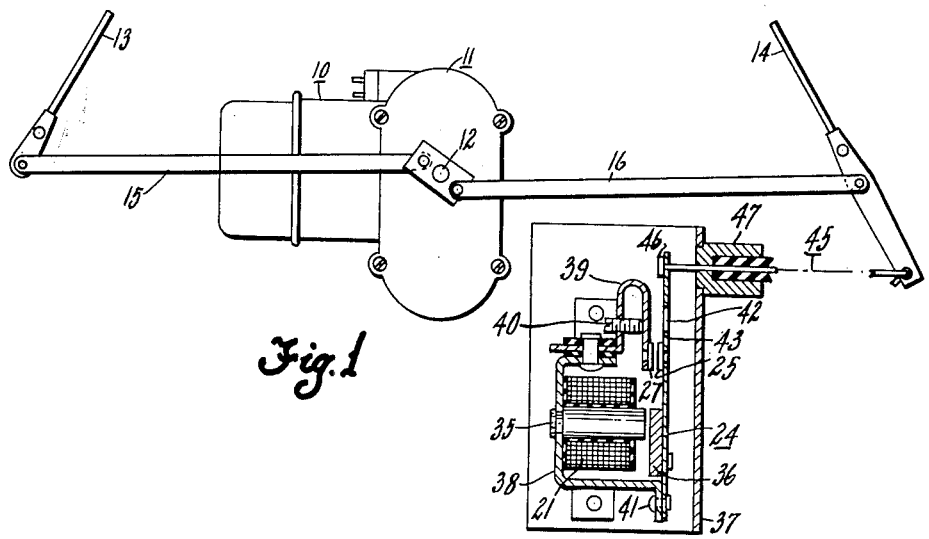
Fig. 1 is a diagrammatic view, partly in section and partly in elevation, illustrating windshield wiper actuating mechanism constructed according to this invention.

With particular reference to Fig. 1, windshield wiper actuating mechanism is shown including an electric motor 10, motion converting mechanism 11 enclosed by a housing and including an oscillatable driven shaft 12 which projects from the housing. The motion converting mechanism 11 does not form any part of this invention, but may be constructed in accordance with the disclosure of copending application, Serial No. 347,021, filed in the names of John B. Dyer and Walter D. Harrison. Suffice it here to say that the motor 10 is of the unidirectional D. C. type, and the mechanism 11 converts rotation of the motor driven shaft into oscillation of the actuating shaft 12 throughout a predetermined arc when the motor is energized, and is designed so that the arc of oscillation imparted to the actuating shaft 12 may be increased automatically so as to move the blades out of the normal range of vision and past one end of the normal wiping stroke to a parked position against a cowl of the motor vehicle, not shown.

As illustrated in Fig. 1, the actuating shaft 12 is connected so as to operate a pair of wiper blades 13 and 14 in synchronization by means of a pair of links 15 and 16. It is to be understood that the usage of links is only by way of illustration and not by way of limitation, as other transmission means, such as flexible cable, may be employed, if convenient.

Figure 2:
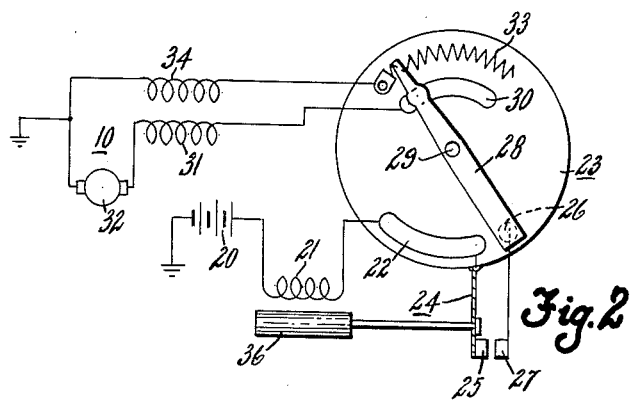
Fig. 2 is a circuit diagram for an electric motor adapted to actuate windshield wiper mechanism.

With particular reference to Fig. 2, a circuit arrangement for controlling the operation of electric motor 10 will now be described. The circuit includes a battery 20, one terminal of which is connected to ground and the other terminal of which is connected through an electromagnetic winding 21, the function of which will be described hereinafter, and thence, to a bus bar 22 forming part of a switch assembly designated generally by the numeral 23. The bus bar 22, in turn, is connected by a wire and a resilient contact carrying member 24 to a contact 25, contact 25 being the movable contact of a parking switch to be described. The switch assembly 23 also includes a terminal 26 connected by a wire with a second contact 27 of the parking switch. Cooperable with the terminal 26 and the bus bar 22 is one end of a rotary contact member 28, which is adapted for rotation about a pivot 29. The switch assembly also includes a second bus bar 30, which is connected by a wire through the series field coil 31 of the electric motor and, thence, to one side of the armature 32, the other side of the armature being connected to ground. The switch assembly 23 further includes a variable resistor 33, one end of which is connected by a wire through the shunt field coil 34 to ground. The contact, or bridging member 28, also has electrical engagement with the bus bar 30 and the variable resistance 33.

Figure 3:
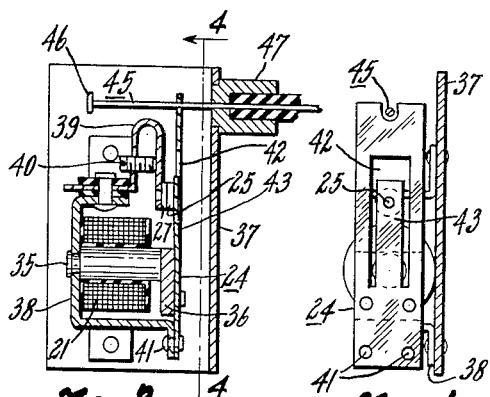
Fig. 3 is a view in elevation illustrating the novel parking switch assembly of this invention.

The winding 21, shown schematically in Fig. 2 and structurally in Figs. 1 and 3, is wound around a magnetic core 35 and, hence, magnetizes the core 35 whenever current flows through the motor 10. An armature 36, schematically shown in Fig. 2 and structurally in Figs. 1 and 3, cooperates with the magnetic core 35, the armature 36 being carried by the resilient contact carrying member 24, likewise shown diagrammatically in Fig. 2 and structurally in Figs. 1 and 3.

Figure 4:
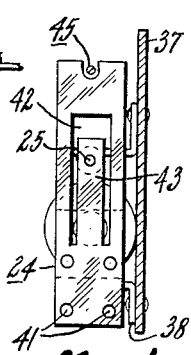
Fig. 4 is a sectional view taken along line 4—4 of Fig. 3.

With particular reference to Figs. 3 and 4, the structural embodiment of the parking switch will now be described. The parking switch assembly is carried by a bracket 37, which is adapted to be mounted on the motor housing in a manner not shown. A frame 38 for supporting the electromagnet, including the winding 21 and the core 35, is suitably attached to the bracket 37. The frame 38 also supports parking switch contact 27 by means of a stiff U-shaped spring member 39, which is riveted, or otherwise suitably connected, to the frame 38. Member 39 is U-shaped to permit adjustment of the contact 27 relative to the resilient contact member 24 by means of an adjusting screw 40 threaded in an opening in one of the legs in the U-shaped member. The end of the screw 40 bears against the other leg of the U-shaped member 39 and by reason of the resiliency of this member, the leg will always be maintained in contact with the end of the screw. It is readily apparent that by turning the screw by means of a suitable tool, the position of parking contact 27 may be varied with respect to the resilient contact carrying member 24 and its parking contact 25.

One end of the resilient contact carrying member 24 is suitably attached to the frame 38, as at 41. The armature 36 is rigidly attached to the member 24 adjacent its connection with the frame 38. The contact member 24, as it is seen in Fig. 4, carries parking contact 25 and has a U-shaped slot 42 therein, the contact 25 being carried by the portion 43 of the member 24 that defines the legs of the U-shaped slot. The end of the member 24 remote from its attachment to the frame 38 is further provided with a slot through which an actuating member 45, having an enlarged head 46, extends. The actuating member 45 is, in turn, supported by a fixture 47 attached to the bracket 37. The actuating member 45, with its head 46, is employed to separate the parking contacts 25 and 27 when the actuating member is moved to the right, as viewed in Fig. 3, to a position wherein the enlarged head 46 abuts the member 24 so as to effect movement thereof in a clockwise direction about its connection with the frame 38.

The actuating member 45 may be moved to the right, as viewed in Figs. 1 and 3, by any suitable means. As depicted in Fig. 1, the member 45 is operatively connected to an extension of the blade 14 such that at a predetermined position of the blade 14, the member 45 will effect separation of parking contacts 25 and 27. In this instance the operation of the member 45 is cyclical, that is, the contacts 25 and 27 are separated during each complete wiping stroke of the blades 13 and 14. However, if the contact member 28 of the switch assembly 23 is in a position where bus bars 22 and 30 are interconnected, periodical opening and closing of the contacts 25 and 27 will have no effect on energization of the motor 10 since these contacts are then shunted. However, if the operator desires to disrupt operation of the wiper blades, he need only move the contact member 28 to the position shown in Fig. 2, in which instance, as soon as the wiper blade 14 approaches the predetermined position at which time the actuating member 45 separates contacts 25 and 27, the motor will be deenergized and the blades will stop in the parked position.

However, the actuating member 45 may be controlled from the motion converting mechanism 11, heretofore alluded to, in a manner similar to that shown in the aforementioned copending application. In this instance the member 45 is not cyclically actuated, but is only actuated when the amplitude of oscillation imparted to the shaft 12 is of the greater magnitude so as to move the wiper blades past the end of the normal wiping stroke and against the cowl of a motor vehicle, not shown. In either event the compensating effect of the electromagnetic winding 21 on the opening of the parking switch contacts 25 and 27 will assure that sufficient motion inertia is always present to move the wiper blades 13 and 14 to a predetermined parked position regardless of the surface conditions of the windshield.

*Operation*

The operation of the parking switch assembly, heretofore described, is as follows. Assuming that the wiper blades are moving throughout their wiping strokes by reason of the fact the switch contact member 28 is in a position interconnecting bus bars 22 and 30; the windshield is thoroughly wet; and the operator desires to disrupt operation of the windshield wiper, the following events will ensue. As heretofore mentioned, the friction between wiper blades and a wet windshield is rather low and, accordingly, very little motor inertia is required to move the blades to a parked position after the motor is deenergized. Since the friction between the wiper blades and the windshield is low, the motor current, which is a function of the friction load, will likewise be low. Thus, it will be desirable to open the parking switch contacts 25 and 27 at a time so that the coasting motor speed will not cause the wiper blades to over-travel. That is, the motor inertia should not be sufficient to move the wiper blades to the parked position after the motor deenergization and then move them out of the parked position before the motor rotation stops completely. In accordance with this invention, the opening of the parking switch contacts 25 and 27 is modified in accordance with the windshield friction so that the wiper blades will move to the parked position under motor inertia and will not over-travel. Thus, with a wet windshield and a relatively low motor current, the magnetizing current flowing through winding 21 will be rather low and the magnetic pull exerted by the core 35 on the armature 36 will, likewise, be rather low. Thus, the resilient contact carrying member 24 which bends toward the electromagnetic core 35 depending upon the amount of current flowing through winding 21 will only be slightly bent, and when the actuating member 45 is moved to the right, only a very short time will elapse before the contacts 25 and 27 are separated.

However, if the windshield is in a tacky condition, as aforedescribed, in which condition high friction exists between the wiper blades and the windshield, the motor current will likewise be high. Thus, the resilient contact member 24 will be bent more toward the electromagnetic core 35 and when the actuating member 45 is moved to the right tending to separate contacts 25 and 27, a greater time delay in opening the contacts 25 and 27 will occur. This greater time delay will keep the motor energized for a longer period of time, thus, compensating for the high friction load, and the contacts 25 and 27 will separate at a time when there will still be sufficient motor inertia present to move the blades to the parked position.

It is apparent from the aforegoing that the present invention provides a unique solution to the parking problems encountered in power driven windshield wiper apparatus wherein motor inertia, or coasting motor is employed, to move the blades to the parked position. The present invention by employing an electromagnetic compensating means, the winding of which is positioned in a circuit so that all motor current flows therethrough, has proved to be very satisfactory under varying conditions of windshield friction.

While the embodiment of the present invention as herein disclosed, constitutes a preferred form, it is to be understood that other forms might be adopted.

What is claimed is as follows:

1. In motor control means of the character described, an electric motor operatively connected to and driving a member imposing a variable load thereon, a circuit arrangement for controlling the energization of said motor including automatic switch means for deenergizing said motor at a first predetermined position of said member, and means to modify the operation of said automatic switch means so that regardless of the variable load imposed by said member, the motor will always have sufficient coasting inertia after deenergization to move said member to a second predetermined position.

2. A parking control for electric windshield wipers comprising, a motor controlling switch, a resilient actuator therefor normally, yieldingly maintaining said switch closed, a member capable of movement by rotation of said motor and disposed to engage and divert said actuator so as to open said switch at a predetermined point of motor rotation, and an electromagnet functioning, when energized, to urge and hold said switch in its closed position and to delay the diversion of said actuator and the opening of said switch by said member for a variable length of time, said electromagnet being connected in circuit with said motor such that all current flowing through the motor flows through the electromagnetic winding thereof.

3. In an electric windshield wiper of the class described wherein wiper blades are operatively connected to and driven by an actuating member, the combination of, an electric motor for driving said actuating member, means determining the normal range of movement of said member, a manual switch for controlling the energization of said motor, automatic switch means effective in a first predetermined position of said member to permit deenergization of said motor by opening said manual switch, and means to modify the operation of said automatic switch means in accordance with the load imposed on said member, the construction and arrangement being such that the motor always has sufficient inertia after deenergization to move the member to a second predetermined position.

4. In motor control means of the character described, an electric motor operatively connected to and driving a member subject to a variable load, a circuit arrangement for controlling the energization of said motor including a manual switch and automatic switch means effective in a first predetermined position of said member to permit deenergization of said motor upon opening of said manual switch, and means to modify the operation of said automatic switch means so that regardless of the variable load imposed by said member the motor will always have sufficient inertia after deenergization to move said member to a second predetermined position.

5. In motor control means of the character described, an electric motor operatively connected to and driving a member imposing a variable load thereon, a circuit arrangement for controlling the energization of said motor including automatic switch means for deenergizing said motor at a first predetermined position of said member, means operatively associated with said automatic switch means to manually adjust the operating characteristics thereof, and means to modify the operation of said automatic switch means so that regardless of the variable load imposed by said member, the motor will always have sufficient inertia after deenergization to move said member to a second predetermined position.

6. In motor control means of the character described, an electric motor operatively connected to and driving a member imposing a variable load thereon, a circuit arrangement for controlling the energization of said motor including automatic switch means for deenergizing said motor at a predetermined position of said member, means operatively associated with said automatic switch means to manually adjust the operating characteristics thereof, and means to modify the operation of said automatic switch means so that regardless of the variable load imposed by said member, the motor will always have sufficient inertia after deenergization to move said member to a predetermined position, said modifying means including an electromagnet, the winding of which is serially connected in the circuit arrangement of said motor so that all motor current flows through said winding, and an armature operatively associated with and attracted by said electromagnet, said armature being operatively associated with said automatic switch means so as to time the opening thereof in response to the motor current.

7. In motor control means of the character described, an electric motor operatively connected to and driving a member subject to a variable load, a circuit arrangement for controlling the energization of said motor including a manual switch and automatic switch means effective in a predetermined position of said member to permit deenergization of said motor upon opening of said manual switch, and means to modify the operation of said automatic switch means so that regardless of the variable load imposed by said member the motor will always have sufficient inertia after deenergization to move said member to a predetermined position, said modifying means including an electromagnet, the winding of which is serially connected in the circuit arrangement of said motor so that all motor current flows through said winding, and an armature operatively associated with and attracted by said electromagnet, said armature being operatively associated with said automatic switch means so as to time the opening thereof in response to the motor current.

8. In motor control means of the character described, an electric motor operatively connected to and driving a member imposing a variable load thereon, a circuit arrangement for controlling the energization of said motor including automatic switch means for deenergizing said motor at a predetermined position of said member, and means to modify the operation of said automatic switch means so that regardless of the variable load imposed by said member, the motor will always have sufficient inertia after deenergization to move said member to a predetermined position, said modifying means including an electromagnet, the winding of which is serially connected in the circuit arrangement of said motor so that all motor current flows through said winding, and an armature operatively associated with and attracted by said electromagnet, said armature being operatively associated with said automatic switch means so as to time the opening thereof in response to the motor current.

9. A parking control for an electric windshield wiper comprising, an electric motor, a motor controlling switch, means operatively associated with said switch and with said wiper to open said switch at a predetermined position of said wiper, and means associated with said switch to automatically modify the opening thereof by said first recited means in accordance with the total motor current flowing at the instant said first recited means becomes operative to open the said switch.

10. In an electric windshield wiper, the combination including a wiper blade, an electric motor operatively connected to said blade for effecting movement of said blade throughout a wiping range, a motor controlling switch, means operatively associated with said switch and said wiper blade capable of opening said switch at a first predetermined position of said wiper blade, and means to automatically modify the operation of said first recited means in opening said switch in accordance with the friction load imposed upon said motor by said wiper blade, the construction and arrangement being such that the motor always has sufficient inertia after deenergization to move the wiper blade to a second predetermined position.

11. The combination set forth in claim 10 wherein said motor controlling switch includes a pair of contacts, and means associated with one of said contacts for manually adjusting the spacial relationship of said contacts.

12. The combination set forth in claim 11 wherein the other of said contacts is carried by a resilient member, and wherein the means for opening said switch comprises a member operatively associated with said resilient member for deflecting the same.

13. In an electric windshield wiper of the class described including a wiper, an electric motor for driving said wiper, means determining the normal range of movement of said wiper, and means capable of moving said wiper beyond one end of its normal range of movement, the combination comprising, a manual switch for controlling the energization of said motor, automatic switch means effective in a first predetermined position of said wiper to permit deenergization of said motor by opening of said manual switch, and means to modify the operation of said automatic switch means in accordance with the friction load encountered by said wiper so that said motor will always have sufficient inertia to move said wiper to a second predetermined parked position after motor deenergization.

14. In an electric windshield wiper, the combination including, a wiper blade, an electric motor operatively connected to said blade for effecting movement of said blade throughout a wiping range, a motor controlling switch, means operatively associated with said switch and said wiper blade capable of opening said switch at a first predetermined position of said blade and means to automatically modify the operation of said first recited means in opening said switch in accordance with the friction load imposed upon said motor by said wiper blade, the construction and arrangement being such that the motor always has sufficient inertia after deenergization to move the wiper blade to a second predetermined position, said last recited means including an electromagnet having a winding connected so that all motor current flows therethrough and an armature operatively associated with and attracted by said electromagnet, said armature being operatively connected with said switch so as to time the opening thereof in response to the motor current.

References Cited in the file of this patent
UNITED STATES PATENTS
2,307,204        Ehrlick _____ Jan. 5, 1943